United States Patent [19]

Delpretti

[11] 4,242,555
[45] Dec. 30, 1980

[54] PROCESS AND APPARATUS FOR ELIMINATING SHORT CIRCUITS IN ELECTRICAL DISCHARGE MACHINING

[75] Inventor: Roger Delpretti, Geneva, Switzerland

[73] Assignee: Ateliers des Charmilles S.A., Geneva, Switzerland

[21] Appl. No.: 878,567

[22] Filed: Feb. 16, 1978

[30] Foreign Application Priority Data

Feb. 23, 1977 [CH] Switzerland .................. 2251/77

[51] Int. Cl.³ .............................................. B23P 1/02
[52] U.S. Cl. .................. 219/69 M; 219/69 C; 219/69 S; 219/69 P
[58] Field of Search ............... 219/69 C, 69 S, 69 M, 219/69 P

[56] References Cited

U.S. PATENT DOCUMENTS

| 3,277,338 | 10/1966 | Webb | 219/69 P |
| 3,609,281 | 9/1971 | Kauffman | 219/69 C |
| 3,671,705 | 6/1972 | Raznitsyn | 219/69 C |
| 3,761,673 | 9/1973 | Sennowitz | 219/69 S |
| 3,864,541 | 2/1975 | Inoue | 219/69 C |
| 3,916,138 | 10/1975 | Pfau | 219/69 P |

*Primary Examiner*—C. C. Shaw
*Attorney, Agent, or Firm*—Hauke & Patalidis

[57] ABSTRACT

Process and apparatus for eliminating short circuits occurring in the machining zone between an electrode workpiece and an electrode tool in the course of an electrical discharge machining operation. Short circuits, caused by bridging of the electrodes by metallic particles, are burnt by an auxiliary high intensity electrical discharge across the gap between the electrodes applied after a predetermined time interval, or time delay, from the beginning of a normal current pulse.

7 Claims, 4 Drawing Figures

PROCESS AND APPARATUS FOR ELIMINATING SHORT CIRCUITS IN ELECTRICAL DISCHARGE MACHINING

BACKGROUND OF THE INVENTION

The present invention relates to a process and apparatus for machining by EDM an electrode workpiece by means of an electrode tool, whereby consecutive voltage pulses are applied across the electrodes to cause current pulses of a predetermined intensity to flow through the gap between the electrodes, and wherein the machining condition in the machining zone between the electrodes are monitored and the intensity of the current pulses is increased when short circuits are detected.

It is well known that the short circuits occurring between the electrode workpiece and the electrode tool in the course of EDM machining operation, which are caused by bridging of the electrodes by metallic particles, more particularly during a finishing pass, can be eliminated by burning or melting by means of high current intensity pulses. Such a method is disclosed, for example, in U.S. Pat. Nos. 2,951,969, 3,609,281 and 3,671,705.

However, the methods disclosed in the above-mentioned patents contemplate applying high intensity current pulses as soon as a short circuit is detected in the machining gap, which generally results in applying high energy pulses across the gap. The application of such high energy pulses across the gap in turn causes a rapid deterioration of the machined surface. Consequently, such a method could be used, until now, only during rough machining where the surface finish is not too important and during which short circuits are few. Such a method was consequently practically unusable for finish machining during which low energy pulses are applied across the gap and in the course of which short circuits are many.

The process and apparatus of the present invention have for principal objects to eliminate the inconveniences of the prior art and to make it possible to apply the principle of burning the metallic bridges formed in the machining zone during a finishing pass as well as during a rough cut. It has been observed that the majority of the metallic particle bridges formed in the machining zone are sufficiently weak to be destroyed by burning off simply by the current flow caused by the short circuit itself, during a fraction of the duration of the current pulse, and that the material removing effectiveness of the pulse reappear before the end of the pulse. Under those conditions, which occur most of the time, it is therefore useless to apply a high current pulse as soon as a short circuit is detected. The novel process of the invention permits to considerably reduce the number of short circuit burning auxiliary pulses as a result of causing an increase of the pulse current only after a predetermined time interval, or time delay, from the beginning of the normal current pulse.

The novel process of the invention thus permits to decrease the number of pulses designed to burn off, or melt away, the metallic bridges causing short circuits, and it permits to correspondingly increase the number of effective machining current pulses. A spectacular increase of machining efficiency is thus achieved, as compared to the machining efficiency achieved by the conventional methods which contemplate cutting off the machining pulses and waiting until the metallic bridges are broken by retraction of the electrode tool. A further advantage of the new process of the invention is to obtain an improved stability of machining together with a narrower machining gap, and to substantially reduce the rate of wear of the electrode tool. Finally, the process of the invention permits to maintain a smooth surface finish in the course of finish machining.

BRIEF DESCRIPTION OF THE DRAWING

The attached drawing represents, in a schematic manner and by way of example, alternative embodiments of apparatus for practicing the EDM method of the present invention. In the drawing, wherein like reference numerals relate to like or equivalent elements.

DETAILED DESCRIPTION OF THE PREFERRED EMBODIMENTS

Figure 1:
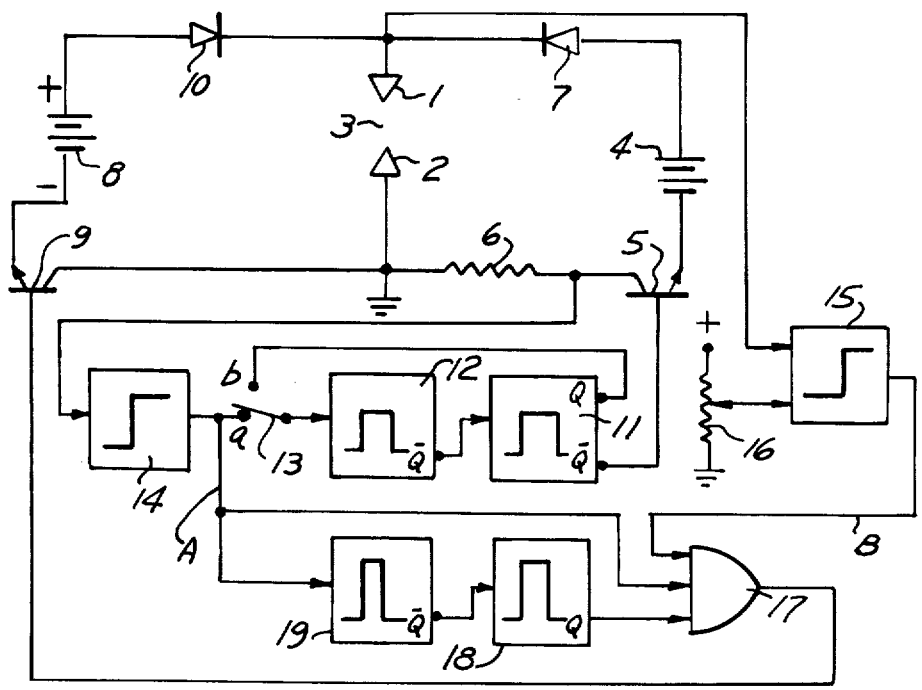
FIG. 1 illustrates a functional schematic of a first embodiment of the invention.

As illustrated in the schematic of FIG. 1, an electrode tool 1 and an electrode workpiece 2, between which is formed a machining gap or zone 3, are connected across a main source 4 of direct current through a transistor 5, a current limiting resistor 6, and a diode 7. The electrode tool 1 and the workpiece 2 are also connected across an auxiliary source 8 of direct current through a second transistor 9 and a second diode 10. The diodes 7 and 10 are connected such as to prevent the passage of current from one of the DC sources to the other, when the two circuits are closed.

The transistor 5, in the pulse generator circuit, is controlled, in known manner, by the inverted output $\bar{Q}$ of a monostable multivibrator 11 in turn controlled by the pulse at the output $\bar{Q}$ of a monostable multivibrator 12. The monostable multivibrator 12 is in turn controlled, when the double-pole switch 13 is placed on its position a, by a Schmitt trigger 14 whose function it is to shape the voltage pulses appearing across the resistor 6, which have an amplitude proportional to the machining current.

The above-described control circuit, which operates as the circuit disclosed, for example, in U.S. Pat. No. 3,916,138, provides current pulses whose duration is determined by the time interval during which the multivibrator 12 is in its unstable state, and permits to apply between the electrodes consecutive voltage pulses separated by a second time interval corresponding to the unstable state of the multivibrator 11. When the switch 13 is connected to its terminal b, the multivibrator 12 is controlled by the output Q of the multivibrator 11 and, under those conditions, the duration of the voltage pulses is determined by the time constant of the multivibrator 12.

The circuit of FIG. 1 further comprises a double input Schmitt trigger 15, operating as a comparator, having an input connected to the electrode tool 1 and the other connected to a voltage reference adjustably determined by a potentiometer 16. The comparator 15 compares the machining voltage level with the reference voltage, such as to provide a signal at its output when the machining voltage is lower than the voltage of a normal electrical discharge, that is when a short circuit occurs in the machining zone.

The output of the comparator 15 is connected to one of three inputs of an AND gate 17 via a line B. The second input of the AND gate 17 is connected to the output Q of a monostable multivibrator 18 which is, in turn, controlled at its input by a signal at the output $\bar{Q}$ of a multivibrator 19. The output of the multivibrator Schmitt trigger 14 is connected, via a line A, to the third input of the AND gate 17 and also to the input of the multivibrator 19. The output of the AND gate 17 controls the transistor 9 by being connected to the base of the transistor.

As soon as current flows through the machining zone, a signal appears on the line A which, in turn, operates the multivibrator 19. In the event that there is a short circuit across the machining gap 3, that is if the voltage of an electrical discharge is lower than the normal voltage, a signal appears on the line B, but that signal is blocked by the output signal from the multivibrator 18 until there occurs a change of state of the multivibrator, as controlled by the output $\bar{Q}$ of the multivibrator 19, after a predetermined time interval, or time delay, from the moment at which starts a short circuited current pulse. If there is still a signal on the line B, the transistor 9 connects the auxiliary DC source 8 across the electrodes 1 and 2, thus causing an additional current of high intensity to flow through the metallic bridge causing the short circuit, such as to burn off or melt away the metallic bridge. However, if the current conductive metallic bridge disappears during the delay time interval, the signal B disappears also, and no control signal on the line is applied to the base of the transistor 9, such that a normal current pulse flows across the gap without connecting through the gap the auxiliary DC power supply 8.

The multivibrator 18 has for purpose to limit the duration of the auxiliary current pulse to a second predetermined time interval in the event that the short circuit has not been eliminated in the course of the current pulse. The multivibrator 18 is set such that the pulse duration of the high intensity auxiliary current flow is short enough not to damage the surface of the electrodes. If the sum of the time constants of the multivibrators 18 and 19 is less than the time constant of the multivibrator 12, the current pulse during short circuit is reduced to its initial level after superimposition of the high current pulse. If the short circuit disappears before the end of the delay time interval determined by the multivibrator 18, the signal on the line B disappears and the transistor 9 cuts off the high intensity current pulse.

The auxiliary power source 8 may consist of a voltage source or of a current source of the type disclosed in U.S. Pat. No. 3,832,510, such as to enable control and adjustment of the auxiliary current intensity as a function of the normal machining conditions.

Figure 2:
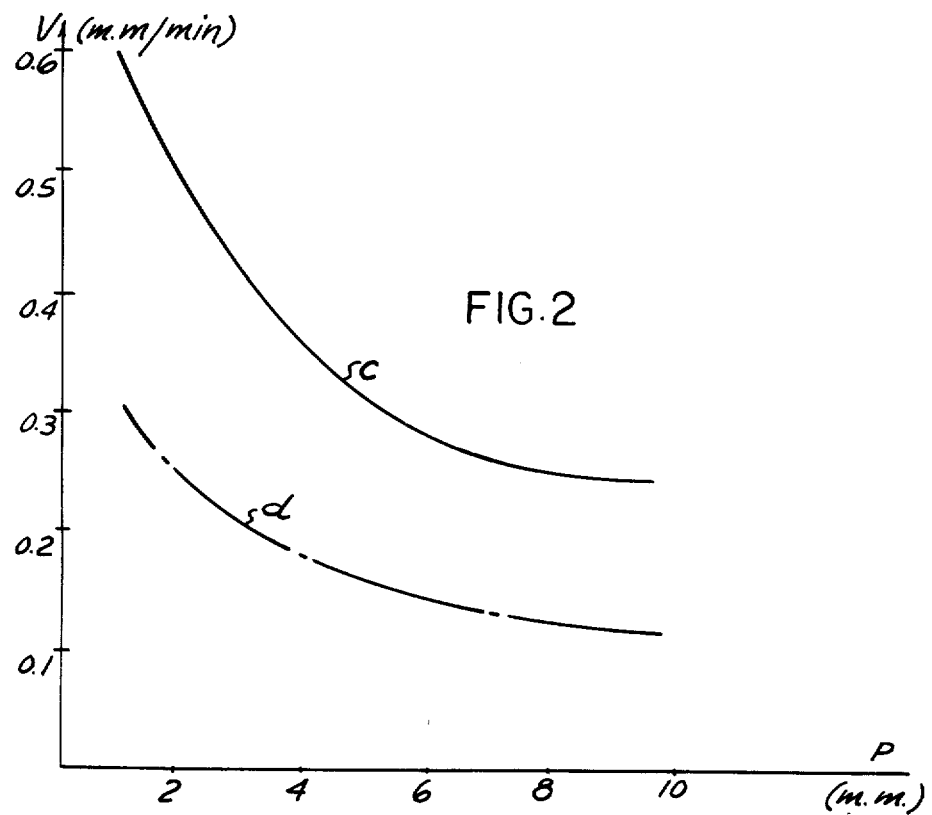
FIG. 2 is a diagram illustrating the practical results achieved by way of the present invention as compared to conventional methods.

FIG. 2 is a diagram illustrating the practical results achieved by using an arrangement as illustrated at FIG. 1 for machining of a steel part of 60 mm. in diameter provided with a toothed portion and sharp angles. The machining speed V, represented in ordinate, is measured as a function of the machining depth P represented in abscissa, in the course of a finish machining pass. Curve c is illustrative of the results achieved by using the new machining process of the invention, and curve d illustrates the results achieved by using, under the same conditions, a conventional piece of equipment. It is readily apparent that the new process of the invention permits to achieve machining speeds which are about twice that of the machining speeds obtained by conventional EDM equipment.

Figure 3:
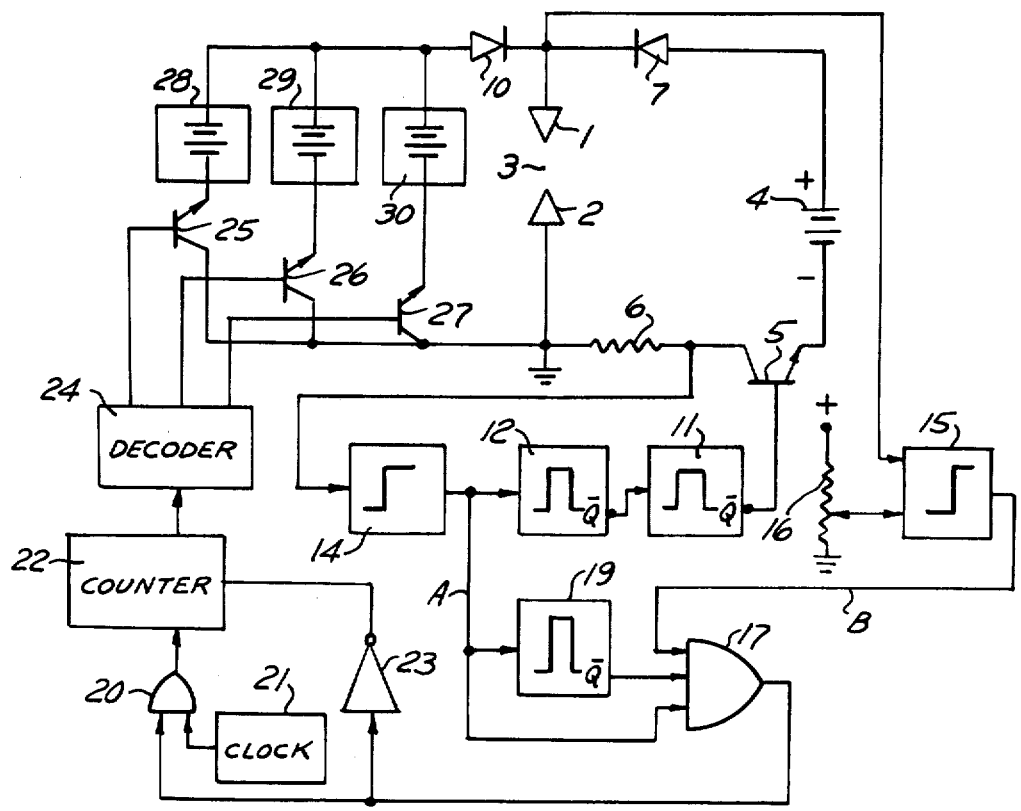
FIGS. 3 and 4 schematically illustrate a second and a third embodiment of the invention, respectively.

FIG. 3 illustrates another embodiment permitting to practice the new process of the invention. Some of the elements illustrated are the same as those illustrated at FIG. 1 and, consequently, have the same reference numerals. In the arrangement of FIG. 3, the switch 13 and the multivibrator 18 of the circuit of FIG. 1 are omitted, and the signal at the output of the AND gate 17 is connected to one of the inputs of an AND gate 20 whose other input receives a timing signal from a clock or pulse generator 21. The output of the AND gate 20 is connected to a counter 22 which is reset to zero by the signal at the output of the AND gate 17 through an inverter 23. The count in the counter 22 is applied to a decoder circuit 24 which selectively controls one of three transistors 25, 26 and 27 as a function of the number of pulses counted by the counter 22. The collector-emitter circuit of each transistor is in series with one of three, for example, auxiliary current sources, such as current source 28, current source 29 and current source 30, capable of being connected in parallel across the electrodes 1 and 2, when the transistors 25, 26, and 27, respectively, are controlled to conductance.

If there is a short circuit still occurring across the machining zone 3 when the monostable multivibrator 19 returns to its stable state, the signal appearing at the output of the AND gate 17 enables the timing pulses from the clock 21 to pass through the AND gate 20, and the decoder circuit 24 controls, one after the other, the transistors 25, 26 and 27 to a conductive state, such as to increase in successive stages the auxiliary current flowing through the machining zone 3. As soon as the short circuit is burnt up, the inverter 23 resets the counter 22 to zero, which instantly cuts off the auxiliary current sources 28, 29 and 30 from being connected across the machining zone. In addition, the decoder circuit 24 is arranged to disconnect also the auxiliary current sources when the number of pulses counted by the counter 22 reaches a value greater than a predetermined number corresponding to a predetermined time interval. In this manner, there is achieved a controlled progression of the auxiliary current which greatly increases the probability of melting the metallic bridge in the course of a pulse causing the short circuit, while still limiting the intensity of the superimposed high discharge current when the short circuit disappears before everyone of the three transistors 25, 26 and 27 is switched to conductance.

Figure 4:
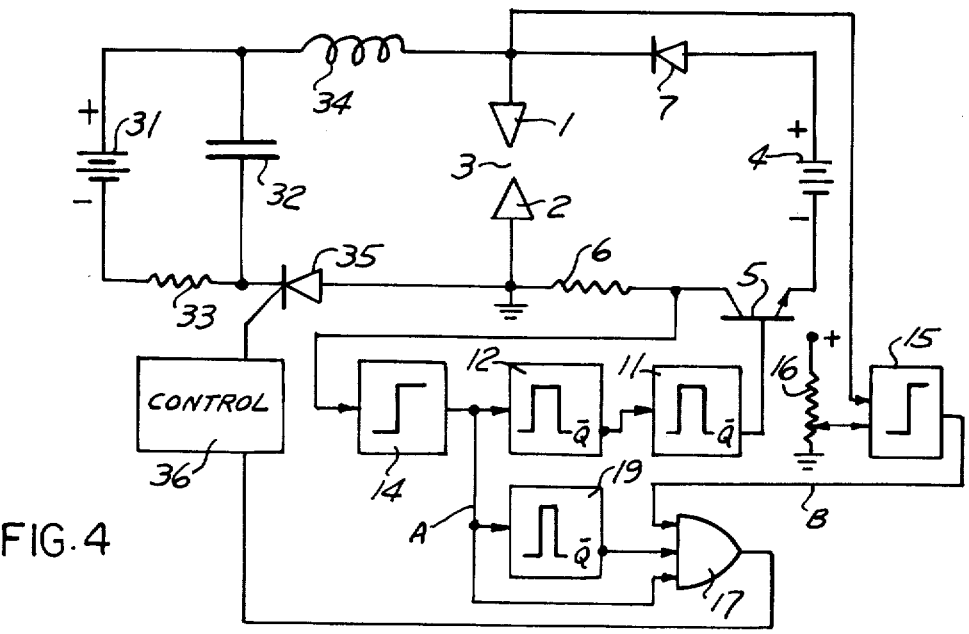

A further arrangement is shown at FIG. 4. The logic circuit which controls the high intensity current pulse is the same as previously described but, in the arrangement of FIG. 4, the auxiliary current pulse is supplied by a relaxation generator. The relaxation generator comprises a voltage source 31 connected across a capacitor 32 through a limiting resistor 33 and a self-inductance coil 34 connected between one of the terminals of the capacitor 32 and the electrode tool 1. A thyristor 35, or three-terminal controllable diode, is connected between the second terminal of the capacitor 32 and the electrode workpiece 2. The thyristor 35 has its control terminal connected to the output of a control circuit 36 which provides a firing pulse to the control terminal of the thyristor 35 when a signal appears at the output of the AND gate 17.

As long as the thyristor 35 is non-conductive, the capacitor 32 is charged to the voltage of the voltage source 31, and as soon as a control signal is supplied at the output of the AND gate 17, as a result of a short circuit appearing across the machining zone 3, the thyristor 35 is controlled to its conducting state and the capacitor 32 is discharged through the machining zone 3, but only after a delay time interval from the beginning of the current pulse. When the current reverses itself due to the effect of the self-inductance coil 34, the thyristor 35 becomes non-conductive. The auxiliary current pulse has an amplitude and a duration which are determined by the values of the elements forming the relaxation circuit.

It will be appreciated that the novel EDM process of the invention can be incorporated in other types of pulse generator circuits in which the current amplitude of the auxiliary pulse is automatically adapted to the machining conditions, and particularly to the level and duration of the normal machining pulses. It will also be appreciated that the auxiliary source of current permitting to increase the normal pulse current can be omitted and replaced by one or more switching elements shunting at least partially the current limiting resistor and controlled by the control signal turning on the auxiliary current pulse. In such arrangement, in the circuit of FIG. 1, for example, the current source 8 and the diode 10 are omitted, and the emitter of the transistor 9 is connected to the collector of the transistor 5.

I claim:

1. In a process for machining an electrode workpiece by an electrode tool wherein consecutive voltage pulses are applied across said electrodes for causing current pulses of a predetermined intensity to flow thereacross, comprising monitoring the machining conditions in the machining gap between the electrodes and increasing the current pulse intensity when such monitoring indicates the presence of a short circuit bridging the gap, the improvement comprising increasing the intensity level of said current pulse after a first predetermined time interval delay from the beginning of said current pulse, interrupting the increased intensity level of said current pulse after a second predetermined time interval delay following said first time interval delay, monitoring the machining conditions during said second time interval delay and reestablishing current pulses of normal intensity as soon as such monitoring indicates the disappearance of said short circuit.

2. The improvement of claim 1 wherein the intensity of said current pulse is increased as a function of time.

3. The improvement of claim 2 wherein said intensity is increased in predetermined steps at predetermined intervals in the course of said current pulse.

4. In an apparatus for machining an electrode workpiece by means of an electrode tool wherein consecutive voltage pulses are applied across a machining zone between said electrode workpiece and said electrode tool for causing current pulses of predetermined intensity to flow thereacross, said apparatus comprising a pulse generator for applying between the electrodes said consecutive voltage pulses separated by a predetermined time interval, means for developing a first electrical signal corresponding to the passage of machining current across the machining zone, means for measuring at least one electrical value representing the machining conditions in the machining zone, means for developing a second electrical signal when said electrical value reaches a predetermined level indicating the presence of a short circuit in said machining zone, at least one switching means for increasing the current intensity across said machining zone, and means for controlling said switching means when said first and second electrical signals appear, the improvement comprising first delay means associated with said first electrical signal for activating said switching means for increasing the current intensity across said machining zone after a first predetermined time interval from the beginning of a current pulse, second delay means deactivating said switching means for decreasing the current intensity across said machining zone after a second predetermined time interval following said first time interval, and means controlled by said second electrical signal for deactivating said switching means upon disappearance of said second electrical signal.

5. The improvement of claim 4 further comprising at least one auxiliary current source, and wherein said switching means is connected in series between said auxiliary current source and said electrodes.

6. The improvement of claim 5 comprising at least two auxiliary current sources and means controlled by said delay means for selectively connecting each of said auxiliary sources to the machining gap at predetermined moments in the course of a current pulse.

7. The improvement of claim 4 wherein said auxiliary sources comprise means for charging a capacitor and means for discharging said capacitor in parallel to said pulse generator, said means for discharging said capacitor being controlled by said switching means.

* * * * *